(12) United States Patent
Jeong

(10) Patent No.: US 8,769,504 B2
(45) Date of Patent: Jul. 1, 2014

(54) METHOD AND APPARATUS FOR DYNAMICALLY INSTRUMENTING A PROGRAM

(75) Inventor: Jae-hoon Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 746 days.

(21) Appl. No.: 12/726,705

(22) Filed: Mar. 18, 2010

(65) Prior Publication Data

US 2010/0251220 A1 Sep. 30, 2010

(30) Foreign Application Priority Data

Mar. 30, 2009 (KR) .................. 10-2009-0027046

(51) Int. Cl.
*G06F 9/44* (2006.01)
*G06F 11/00* (2006.01)
*G06F 11/36* (2006.01)

(52) U.S. Cl.
CPC .................................. *G06F 11/3644* (2013.01)
USPC ........................... 717/130; 717/124; 714/38.1

(58) Field of Classification Search
CPC .................. G06F 11/362; G06F 11/3644
USPC .................. 717/124–135; 714/37, 38.1
See application file for complete search history.

(56) References Cited

U.S. PATENT DOCUMENTS

| | | | | |
|---|---|---|---|---|
| 4,819,234 A * | 4/1989 | Huber | | 717/129 |
| 5,774,724 A * | 6/1998 | Heisch | | 717/129 |
| 6,848,097 B1 * | 1/2005 | Alverson et al. | | 717/124 |
| 6,898,785 B2 * | 5/2005 | Ramasamy et al. | | 717/129 |
| 6,957,421 B2 * | 10/2005 | Hundt et al. | | 717/130 |
| 7,000,225 B2 * | 2/2006 | Sangavarapu et al. | | 717/129 |
| 7,047,521 B2 * | 5/2006 | Bunnell | | 717/130 |
| 7,114,150 B2 * | 9/2006 | Dimpsey et al. | | 717/131 |
| 7,260,815 B1 * | 8/2007 | Chen et al. | | 717/134 |
| 7,428,727 B2 * | 9/2008 | Alverson et al. | | 717/134 |
| 7,487,502 B2 * | 2/2009 | Wang et al. | | 718/102 |
| 7,543,186 B2 * | 6/2009 | Schultz | | 714/35 |
| 7,661,035 B2 * | 2/2010 | DeWitt et al. | | 714/45 |
| 7,823,129 B2 * | 10/2010 | Dimpsey et al. | | 717/124 |
| 8,136,097 B2 * | 3/2012 | Konishi et al. | | 717/129 |
| 2002/0073402 A1 * | 6/2002 | Sangavarapu et al. | | 717/129 |
| 2002/0104074 A1 * | 8/2002 | Hundt et al. | | 717/129 |

(Continued)

FOREIGN PATENT DOCUMENTS

| JP | 03-268034 A | 11/1991 |
|---|---|---|
| JP | 2007-133536 | 5/2007 |

(Continued)

OTHER PUBLICATIONS

Japanese Office Action issued Nov. 19, 2013 in counterpart Japanese Patent Application No. 2010-045618.

*Primary Examiner* — Qing Chen
(74) *Attorney, Agent, or Firm* — NSIP Law

(57) ABSTRACT

A dynamic instrumentation method and apparatus which may trace, debug, and profile the execution of a running program without affecting the operation of the program, are provided. According to the method, a break instruction is inserted and executed at start of execution of a first instruction and immediately after execution of the last instruction of a function constituting the program. Environment values of the function before and after execution may be identified. The program may be dynamically instrumented without being affected by any tracing or debugging operations.

17 Claims, 7 Drawing Sheets

(56) References Cited

U.S. PATENT DOCUMENTS

| | | | |
|---|---|---|---|
| 2002/0152455 A1* | 10/2002 | Hundt et al. | 717/131 |
| 2002/0199172 A1* | 12/2002 | Bunnell | 717/128 |
| 2003/0037318 A1* | 2/2003 | Ramasamy et al. | 717/130 |
| 2004/0163077 A1* | 8/2004 | Dimpsey et al. | 717/130 |
| 2004/0163083 A1* | 8/2004 | Wang et al. | 718/102 |
| 2005/0034024 A1* | 2/2005 | Alverson et al. | 714/38 |
| 2006/0069959 A1* | 3/2006 | Schultz | 714/35 |
| 2007/0006168 A1* | 1/2007 | Dimpsey et al. | 717/130 |
| 2007/0168985 A1* | 7/2007 | Konishi et al. | 717/124 |
| 2007/0226702 A1* | 9/2007 | Segger | 717/130 |
| 2009/0083715 A1* | 3/2009 | DeWitt et al. | 717/128 |
| 2009/0113240 A1 | 4/2009 | Vera et al. | |
| 2010/0095281 A1* | 4/2010 | Raber | 717/129 |

FOREIGN PATENT DOCUMENTS

| | | |
|---|---|---|
| JP | 2007-133590 | 5/2007 |
| JP | 2008-123438 A | 5/2008 |
| KR | 10-2003-0041612 | 5/2003 |
| KR | 10-2008-0098683 | 11/2008 |

* cited by examiner

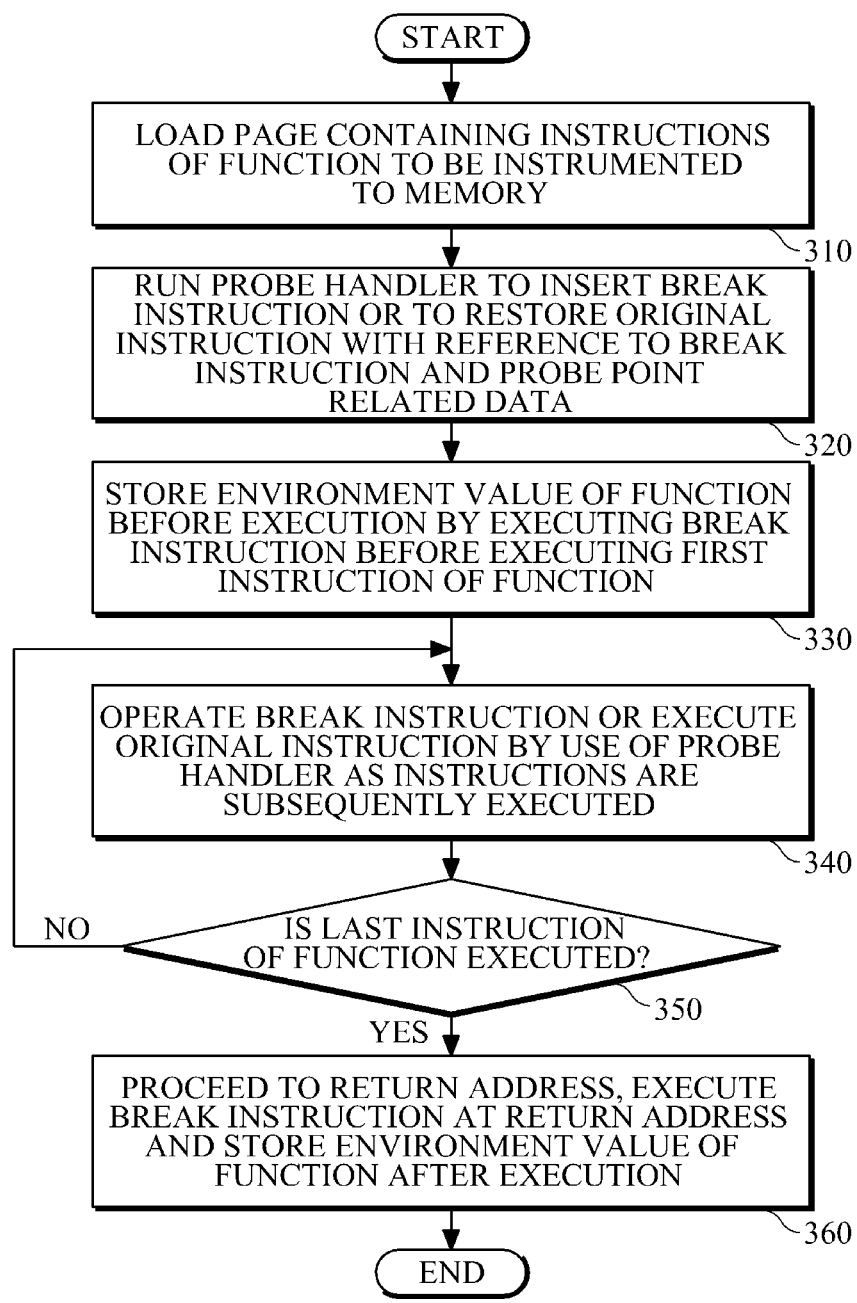

METHOD AND APPARATUS FOR DYNAMICALLY INSTRUMENTING A PROGRAM

CROSS REFERENCE TO RELATED APPLICATION

This application claims the benefit under 35 U.S.C. §119(a) of a Korean Patent Application No. 10-2009-0027046, filed on Mar. 30, 2009, the entire disclosure of which is incorporated herein by reference for all purposes.

BACKGROUND

1. Field

The following description generally relates to the execution trace and the instrumentation of a program, and more particularly, to a method and apparatus for dynamically tracing and instrumenting a program.

2. Description of the Related Art

In developing application programs, a number of methods are employed to detect errors in the programs or systems. Generally, a program is developed through an iterative process, each stage of which consists of program design or modification followed by testing and analysis of the program. A commonly encountered technique for analyzing programs is to embed instrumentation within the program for collecting various types of data while the program is running. Data may be collected and processed in various ways to provide a basis for analyzing the program. Often, embedded instrumentation provides the only practical approach to understanding the real-time behavior of complex programs and automated systems.

For example, break instructions may be inserted at various locations of instructions of a program to be instrumented such that exceptions may be generated, and an operating system (OS) may detect hardware signals resulting from the exceptions. As a result, the OS may run a trace program to identify a problem. Examples of the above methods include a single-stepping in line (SSIL) method, a single-stepping out of line (SSOL) method, and the like.

In these methods, both the execution of a program to be instrumented and also the operations of an OS that supports the program's execution are traced. To this end, data that is generated and processed in different areas, for example, an application area where a program to be instrumented is run and an operating system area, must be coherently managed.

However, in this process, the program to be instrumented may be run in an application area, and management of a memory or addresses may become complicated. For example, an address of the program may need to be changed because of a change in the system, a change in the operating system, a change in the program, and the like.

SUMMARY

In one general aspect, provided is a method of dynamically instrumenting a program using a dynamic instrumentation apparatus, the method comprises storing one or more environment values of a function before execution by inserting a break instruction at a location of a first instruction of the function included in the program and executing the break instruction at the start of execution of the first instruction, and storing one or more environment values of the function after execution by executing a break instruction when execution proceeds to a return address after the last instruction of the function is executed.

When a break instruction is executed in an application area, a probe handler may be run by an exception handler in an operating system (OS) area, and the probe handler may store the one or more environment values of the function.

The storing of the one or more environment values of the function before execution may include storing an instruction of the function, replacing the instruction with a break instruction, storing the one or more environment values of the function before execution in response to executing the break instruction, and restoring and executing the stored instruction.

The storing of the one or more environment values of the function before execution may include inserting the break instruction at a location of the first instruction of the function after storing the first instruction.

The storing of the one or more environment values of the function before execution may further include storing a second instruction of the function, inserting a break instruction at a location of the second instruction after storing the environment value of the function before execution, and changing a return address of the function in response to execution of the break instruction inserted at the location of the first instruction.

The storing of the one or more environment values of the function before execution may further include inserting break instructions at the location of the first instruction and a location of a third instruction of the function, when the break instruction inserted at the location of the second instruction is executed after the first instruction of the function has been restored and executed.

The storing of the one or more environment values of the function before execution may further include inserting a break instruction at the location of the second instruction again and restoring and executing the third instruction, when the break instruction inserted at the location of the third instruction is executed, and after the second instruction has been restored and executed.

The return address of the function may be set to the location of the second instruction of the function.

The storing of the one or more environment values of the function after execution may include moving an execution location to the location of the second instruction set as the return address of the function once the last instruction of the function is executed, and identifying the one or more environment values of the function after execution by executing the break instruction inserted at the location of the second instruction.

In another aspect, provided is an apparatus for dynamically instrumenting a program, the apparatus comprises an instruction managing unit to store instructions of a function of a program and to insert a break instruction at a location of each instruction, and a probe unit to store one or more environment values of the function according to execution of each break instruction.

The instruction managing unit may insert and execute the break instruction at a location of a first instruction of the function at the start of execution of the first instruction and may manage the instructions such that an execution location proceeds to a return address of the function and a break instruction inserted at the return address is executed when the last instruction of the function is executed.

The probe unit may identify the one or more environment values of the function before execution by executing the break instruction inserted at the location of the first instruction and may identify the one or more environment values of the function after execution by executing the break instruction inserted at the return address.

In another aspect, provided is a method of an apparatus for dynamically tracing a software program, the method comprises determining that a first instruction of a function of a software program to be executed is not stored in memory and substituting a break instruction in place of the first instruction, loading to memory a corresponding page including the first instruction and executing the break instruction thereby generating an exception, and in response to the exception being executed, measuring and storing one or more environment values of the software program.

The method may further comprise, for each subsequent instruction of the software program, substituting a subsequent break instruction in place of the subsequent instruction, restoring the previous instruction and executing the previous instruction, changing the execution location of the program to the subsequent instruction, inserting a previous break instruction in place of the previous instruction, executing the subsequent break instruction thereby generating a subsequent exception, and in response to the subsequent exception, measuring and storing environment values of the software program.

When the subsequent instruction is the last instruction of the software program, the environment values of the software program may be measured and stored, the last instruction may be restored and executed, and the execution location of the program may be changed back to a previous instruction.

The one or more environment values may comprise values that a user desires to know for detecting an error of a program, and the environment values may include at least one of a register value, a location of a stack, and a location of the first instruction.

The break instruction of the program may be executed in an application area and the environment values may be measured by a probe handler that operates in an operating system area.

Other features and aspects will be apparent from the following detailed description, the drawings, and the claims.

BRIEF DESCRIPTION OF THE DRAWINGS

FIG. 3 is a flowchart illustrating an example of a method for dynamically instrumenting a program.

Figure 1:
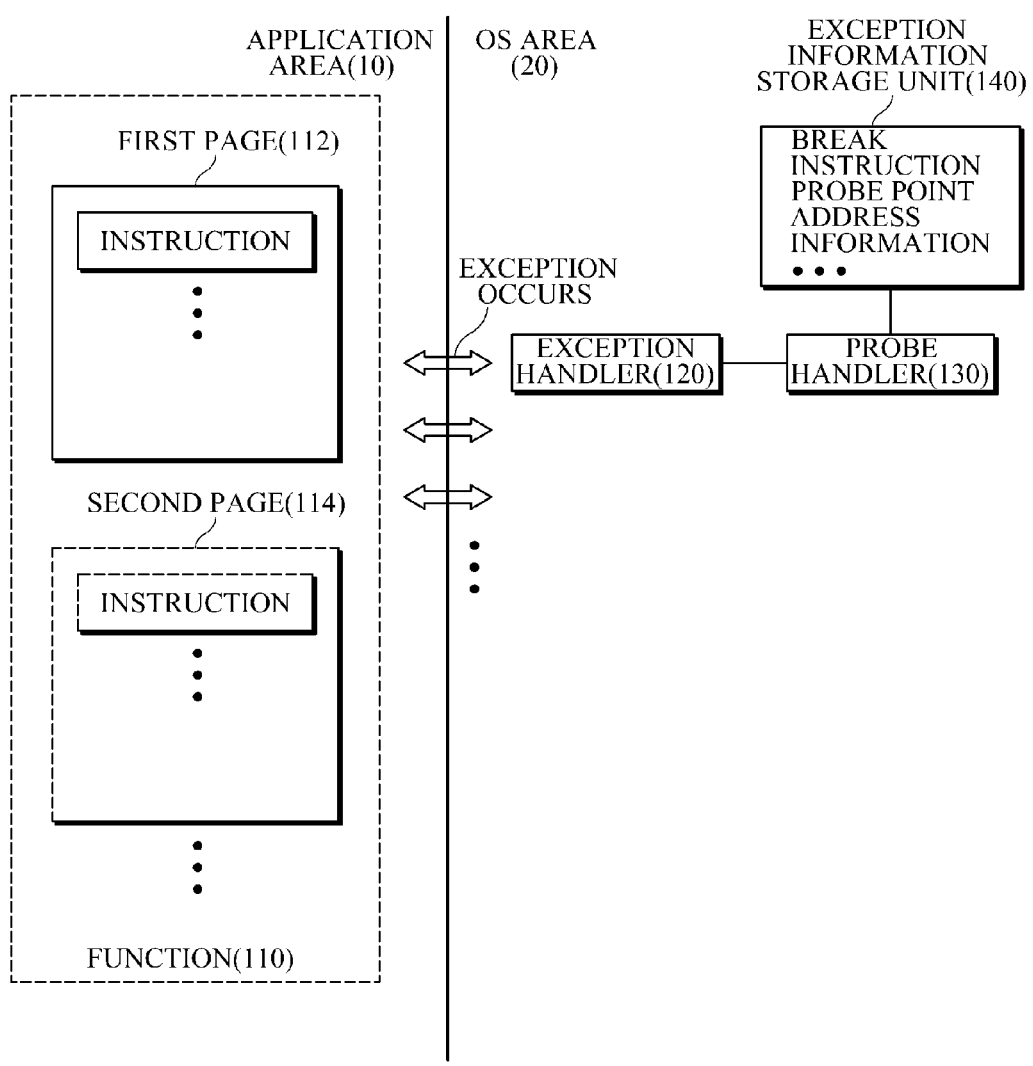
FIG. 1 is a diagram illustrating an example of processing an exception based on dynamic instrumentation.

Throughout the drawings and the detailed description, unless otherwise described, the same drawing reference numerals are understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Descriptions of well-known functions and structures may be omitted for increased clarity and conciseness.

FIG. 1 illustrates an example of processing an exception based on dynamic instrumentation.

Referring to FIG. 1, an application program may include one or more functions for executing the application program. The function 110 to be instrumented may include one or more instructions, for example, one instruction, two instructions, three instructions, four instructions, or more. The instructions are grouped together in pages. In the example shown in FIG. 1, the function 110 includes a first page 112 and a second page 114. The instructions are loaded on a page-by-page basis to a system memory so that the function 110 may be executed. In other words, when executing the function 110, not all instructions are simultaneously loaded to the system memory, rather, a first page 112 is loaded to the system memory and executed, and then the subsequent pages may be loaded to the system and executed, such as second page 114.

During the execution of the function 110, one or more system calls and handlers that operate in both an application area 10 and in an operating system (OS) area 20, may be executed. When executing the function 110, the entry from the application area 10 to the OS area 20 may be performed according to an exception. When an exception occurs, an exception handler 120 is called to run a probe handler 130. Typically, exceptions are used to indicate that something has gone wrong with a program. The exception may be called by hardware or by software. By handling exceptions, the program ensures that the code of the program can handle error conditions that may arise.

An exception indicates an error condition that changes the normal flow of control in a program. Hardware exceptions include, for example, a reset, an interrupt, a signal from a memory management unit, and the like. Exceptions may be generated, for example, by the arithmetic logic unit or a floating-point unit for numerical errors such as divide by zero, overflow, underflow, and the like, or instruction decoding errors such as privileged, reserved, trap, undefined instructions, and the like. Software exceptions may be applied to any kind of error checking which alters the normal behavior of the program. One example of a software exception is a break instruction.

The probe handler 130 performs procedures for the processing of an exception. The probe handler 130 uses break instructions and probe point address information which are stored in an exception information storage unit 140. The procedures for processing an exception are further described with reference to FIGS. 2A through 2G.

FIGS. 2A through 2G illustrate a process for dynamically instrumenting a program.

Figure 2A:
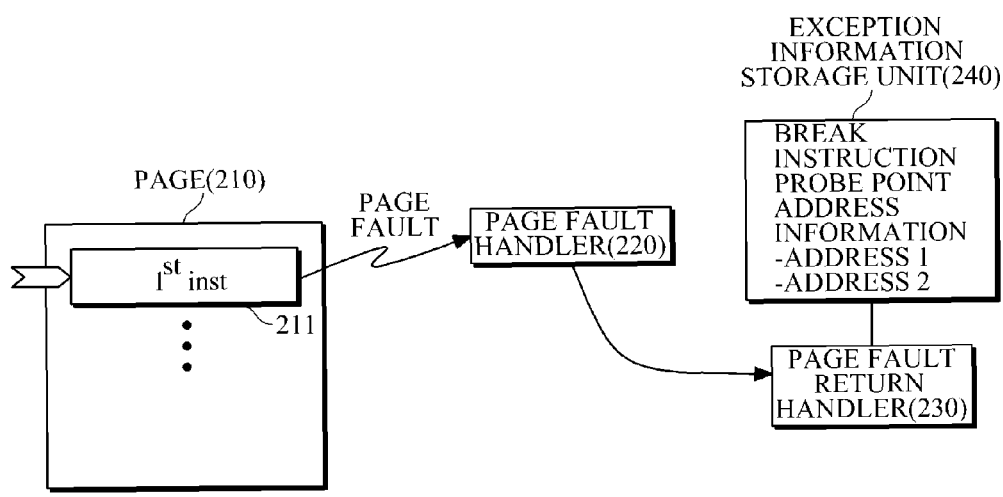
FIGS. 2A through 2G are diagrams illustrating a process for dynamically instrumenting a program.

Referring to the example shown in FIG. 2A, a first instruction 211 included in a function needs to be performed to execute the function. However, if a page 210 containing the first instruction 211 has not yet been loaded to a system memory, a page fault occurs. In response to the occurrence of the page fault, a page fault handler 220 may be executed to load the corresponding page 210 to the system memory.

Figure 2B:
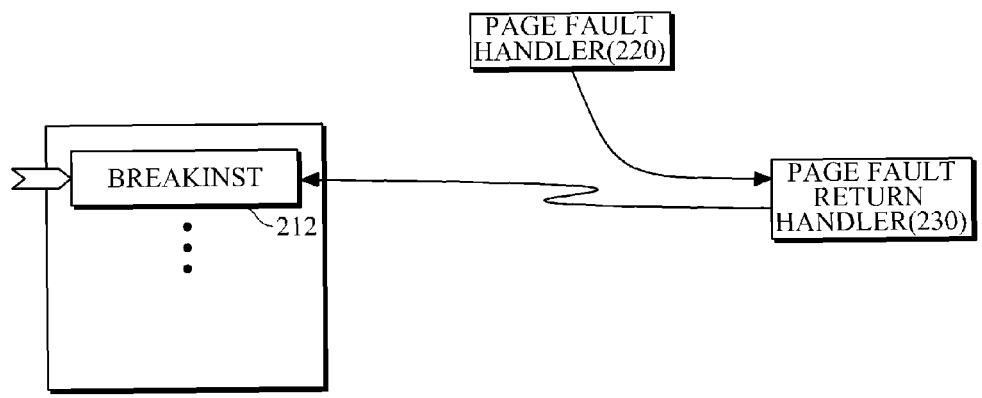

Thereafter, a page fault return handler 230 is executed to replace the first instruction 211 with a break instruction 212, as shown in FIG. 2B. The page fault return handler may store the first instruction 211 in storage to be accessed later. An exception information storage unit 240 may store break instructions and address information of a location to be probed.

As shown in the example of FIG. 2A, once the corresponding page 210 is loaded to the system memory, the first instruction 211 included in the page 210 may be executed. Because the first instruction 211 is replaced with the break instruction 212 by the page fault return handler 230, as shown in the example of FIG. 2B, the break instruction 212 at the first location of the page 210 is executed.

Figure 2C:
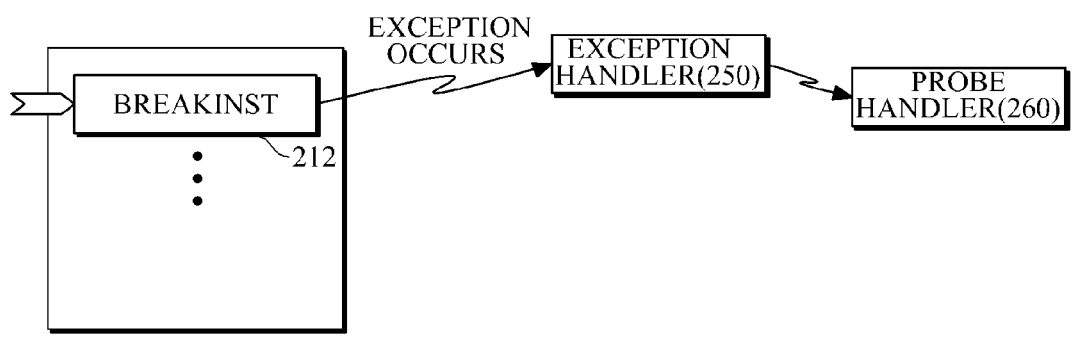

As shown in the example of FIG. 2C, in response to the execution of the break instruction 212, an exception occurs, and an exception handler 250 is called. The exception handler 250 may run a probe handler 260. The probe handler 260 measures environment values and stores them. The environment values may be any values that a user desires to know for detecting an error of a program to be instrumented, and may include one or more of register values, a value of a particular variable, a location of a stack, a location of the first instruction 211, and the like. In addition, the probe handler 260 may change a return address of a corresponding function to a location value of a second instruction. After storing the second instruction, a break instruction may be substituted for the second instruction. The first instruction 211 may then be restored to the original location for execution.

Figure 2D:
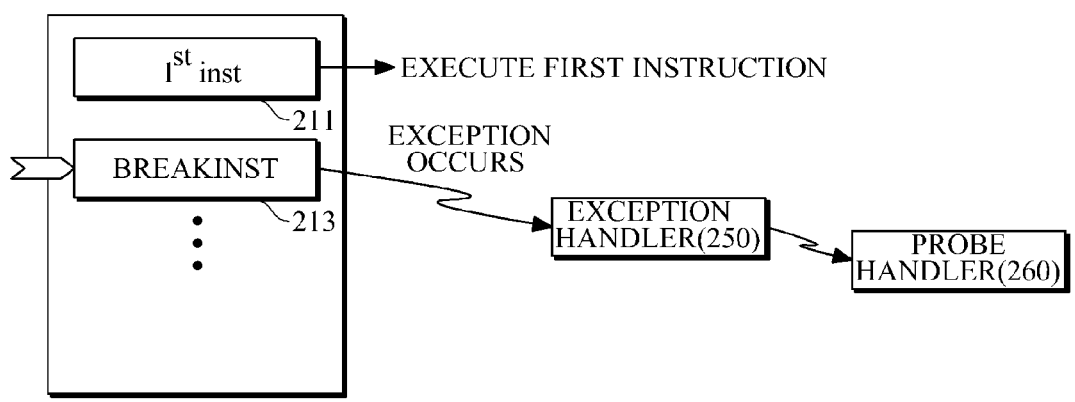

Referring to the example shown in FIG. 2D, the restored first instruction 211 may be executed, and then a program execution location may be moved to the second instruction to be executed next. Because the second instruction was replaced with a break instruction 213 by the probe handler 260 as shown in FIG. 2C, an exception occurs according to the execution of the break instruction 213. Thereafter, the exception handler 250 may be called again, and the exception handler 250 may control the probe handler 260.

The probe handler 260 may replace the first instruction and a third instruction with break instructions and may restore the second instruction. Meanwhile, the first instruction and the third instruction may be stored in storage.

Figure 2E:
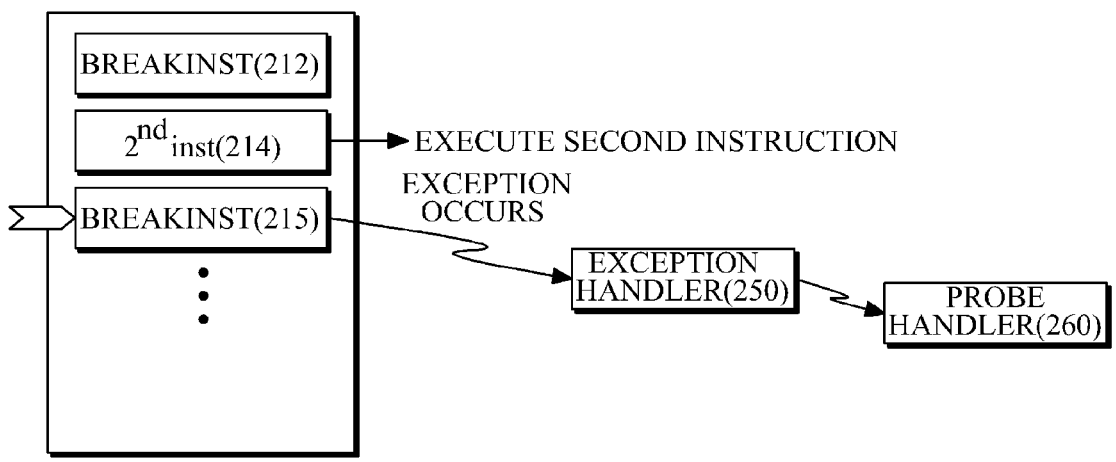

Referring to the example shown in FIG. 2E, the restored second instruction 214 may be executed, and the program execution may proceed to the third instruction. Because the third instruction was replaced with the break instruction 215 as shown in FIG. 2D, an exception occurs according to the execution of the break instruction 215, and the exception handler 250 may be called again to run the probe handler 260.

Figure 2F:
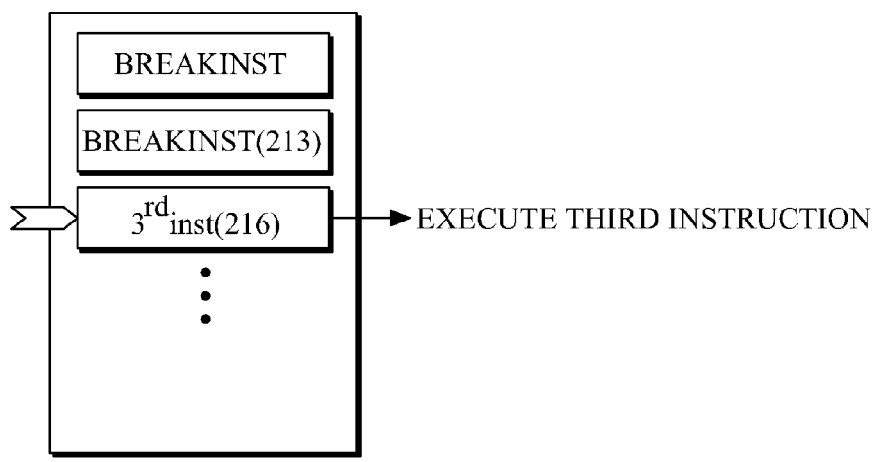

The probe handler 260 replaces the second instruction with the break instruction again, and restores the third instruction. After the second instruction is replaced with the break instruction 213 as shown in FIG. 2F, the third instruction 216 may be executed. Thereafter, the following instructions may be executed until the last instruction of the function is executed.

For each subsequent instruction of the software program, a subsequent break instruction may be substituted in place of the subsequent instruction. The previous instruction may be restored and executed. The execution location of the program may then be changed to the location of the subsequent instruction. A break instruction may be inserted in place of the previous instruction. The subsequent break instruction may be executed to generate a subsequent exception. In response to the subsequent exception, environment values of the software program may be measured and stored.

Figure 2G:
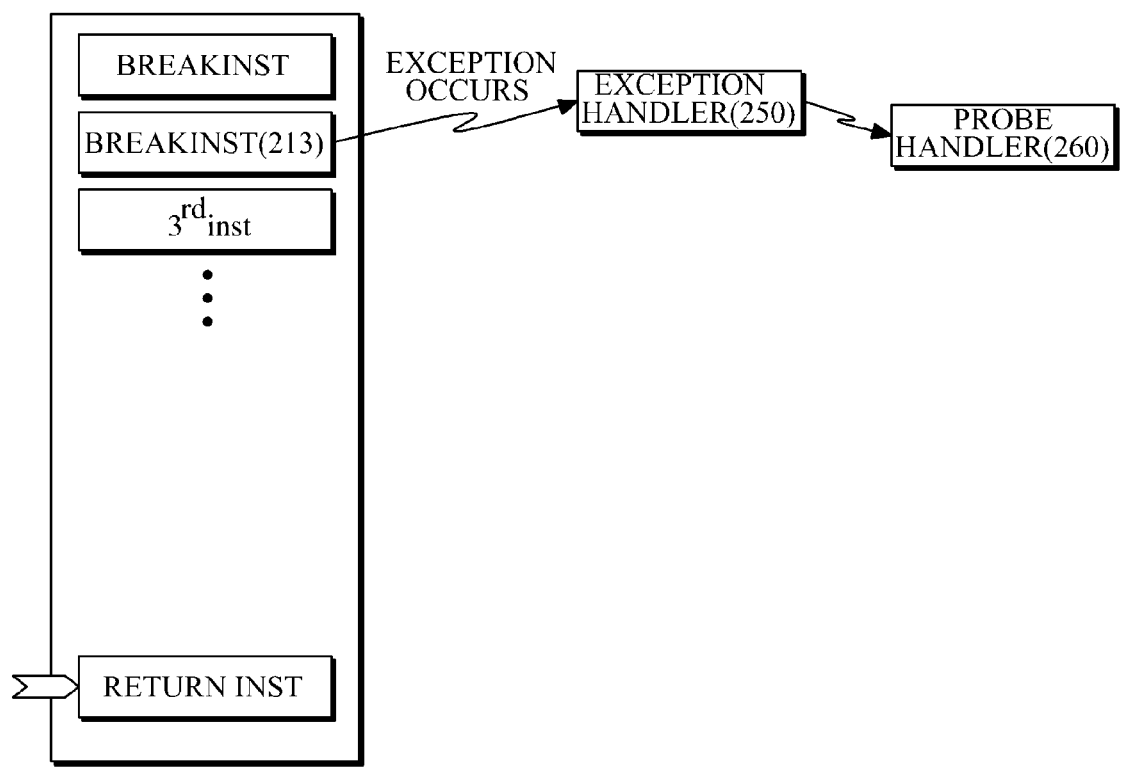

Once the last instruction of the function is executed, as shown in the example of FIG. 2G, the program execution may return to a previous instruction, for example, to the second instruction which is indicated by a return instruction 217. Based on the break instruction 213, which is substituted for the second instruction as shown in FIG. 2F, an exception occurs according to the execution of the break instruction 213, and the exception handler 250 is called to run the probe handler 260. The probe handler measures the environment values and stores them. The environment values may be any values that the user desires to know for detecting an error of the program to be instrumented, and may include register values, values of particular variables, a location of a stack, and the like. Accordingly, the environment values of a function before execution and after execution may be obtained.

FIG. 3 illustrates an example of a method for dynamically instrumenting a program. Referring to FIG. 3, in 310, a page containing instructions of a function that is included in a program to be instrumented is loaded to a memory. This process may be performed by the page fault handler 220 as described with reference to FIG. 2A.

Referring to FIG. 2 and FIG. 3, when a first instruction of the function is executed, a break instruction may be inserted at the location of the first instruction and executed, so that environment values of the function before execution may be stored. For example, in 320, the break instruction may be inserted or a probe handler for restoring the original instruction may be performed with reference to the break instruction and the related probe point data. When an exception instruction is executed, the probe handler 260 may be run by the exception handler 250 in an OS area, and environment values of the function before execution may be stored in 330. The environment values may include values that the user desires to know for detecting an error of the program to be instrumented. For example, the environment values may include one or more of register values, values of particular variables, and/or a location of a stack.

The instructions forming the function are pre-stored before being substituted by the break instructions and the pre-stored instructions are restored after the break instructions are executed. Thus, the execution of the break instruction does not affect the execution of the function.

Examples of the insertion operation and the operation of the break instruction are provided below. The first instruction of the function is stored, and a break instruction is inserted at the location of the first instruction. Thereafter, the break instruction is executed and an environment value before executing the function is stored. The second instruction of the function may be executed, and a break instruction may be inserted at the location of the second instruction.

In the meantime, a return address of the function may be changed to the location of the second instruction. The break instruction at the location of the second instruction may be executed after the first instruction of the function is restored and executed. Break instructions may be inserted at the locations of the first instruction and the third instruction of the function. Once the break instruction at the location of the third instruction is executed after the second instruction is restored and executed, a break instruction may be inserted at the location of the second instruction again and the third instruction may be restored and executed. Thereafter, the original instructions may be subsequently executed.

As described above, the instructions forming the function may be continuously executed, and the break instructions may be replaced with the original instructions by the probe handler 260. The description of the above procedures has been provided with reference to FIGS. 2C to 2F. Referring again to FIG. 3, in 340 the exception may be performed by executing the break instructions or execution of the original instructions may be performed until the last instruction of the function.

In 350, a determination is made as to whether the last instruction of the function has been executed, and if the last instruction has been executed, the execution proceeds to a location indicated by a return address and a break instruction stored at the location is executed. In 360, an environment value of the function immediately after execution is stored.

When the execution proceeds to the return location after the last instruction of the function is executed, the break instruction may be executed to store the environment value of the function immediately after execution. In other words, once the last instruction of the function is executed, the execution location may move to a previous location of the function, for example, the second instruction. The previous instruction is indicated by the return address, and the break instruction inserted at the location of the second instruction may be executed such that the environment value of the function immediately after execution is identified in an OS area.

Figure 4:
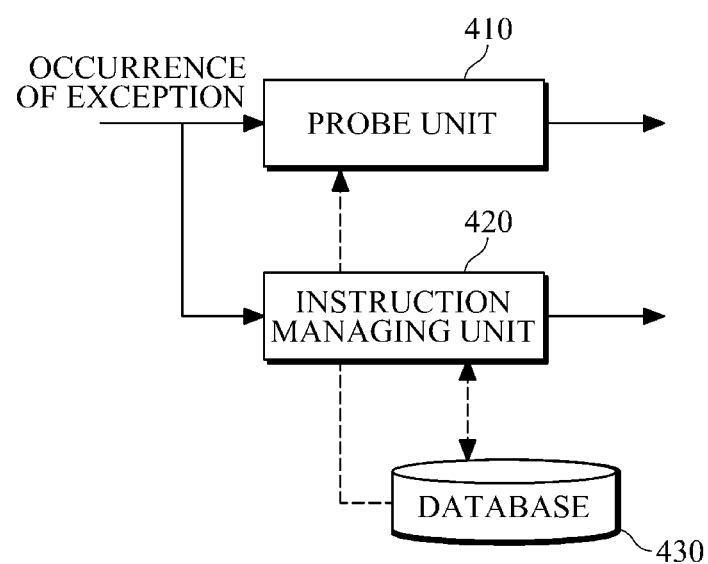
FIG. 4 is a diagram illustrating an example of a dynamic instrumentation apparatus.

FIG. 4 illustrates an example of a dynamic instrumentation apparatus. The dynamic instrumentation apparatus may include a computer, a terminal, and the like. The dynamic instrumentation apparatus includes an instruction managing unit 420, a probe unit 410, and a database 430. The instruction managing unit 420 stores instructions of a function included in a program, or inserts break instructions at locations of the instructions of a function. For example, the instruction managing unit 420 may insert a break instruction at a location of a first instruction of the function and may execute the break instruction at the start of execution of the first instruction. The instruction managing unit 420 allows the execution to proceed to a return address for a break instruction at the return location to be executed when the last instruction of the function is executed. The description of the insertion and management of the break instructions are provided with reference to FIGS. 2A to 2G, and thus is omitted here.

The probe unit 410 stores environment values of the function according to execution of the break instructions. For example, the probe unit 410 may identify an environment value of the function before execution by executing the break instruction inserted at the location of the first instruction. The probe unit 410 may identify the environment value of the function after execution by executing the break instruction inserted at the location of the return address of the function. The database 430 stores break instructions and address information of the locations to be probed.

The instruction managing unit 420 and the probe unit 410 may be implemented by a probe handler that is executed by an exception handler in an OS area.

According to the above-described examples, by dynamically tracing a function of a program to be instrumented, a processing program for storing the detailed tracing results may be run in an operating system (OS) area, while the program may be processed in an application area. The execution of the program may be traced without affecting the execution of the program itself.

To trace a program including one or more functions, break instructions may be inserted in place of each instruction of a function. In response to the execution of the break instruction an exception occurs, and an exception handler is called. The exception handler controls a probe handler. The probe handler measures environment values (i.e. trace results of the program) and stores them. The environment values may include any values that a user desires to know for detecting an error of a program to be instrumented. This process may be repeated for each instruction, of each function of the program. In doing so, the program may be dynamically traced without affecting the execution of the program.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like.

The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it is understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of dynamically instrumenting a program using a dynamic instrumentation apparatus, the method comprising:

storing one or more environment values of a function before execution of the function by inserting a break instruction at a location of a first instruction of the function included in the program and executing the break instruction at a start of execution of the first instruction of the function; and storing the one or more environment values of the function after execution of the function by executing the break instruction in response to execution of the function proceeding to a return address of the function after a last instruction of the function is executed, wherein the program is executed in an application area and a probe handler stores the one or more environment values of the function in an operating system (OS) area such that the program is traced without affecting execution of the program.

2. The method of claim 1, wherein, in response to the break instruction being executed in the application area:

the probe handler is run by an exception handler in the operating system (OS) area; and the probe handler stores the one or more environment values of the function.

3. The method of claim 1, wherein the storing of the one or more environment values of the function before execution of the function comprises:

storing an instruction of the function;

replacing the instruction with a break instruction;

storing the one or more environment values of the function before execution of the function in response to executing the break instruction; and restoring and executing the stored instruction.

4. The method of claim 1, wherein the storing of the one or more environment values of the function before execution of the function comprises inserting the break instruction at a location of the first instruction of the function after storing the first instruction of the function.

5. The method of claim 4, wherein the storing of the one or more environment values of the function before execution of the function further comprises:

storing a second instruction of the function;

inserting a break instruction at a location of the second instruction of the function after storing the one or more environment values of the function before execution of the function; and changing a return address of the function in response to execution of the break instruction inserted at the location of the first instruction of the function.

6. The method of claim 5, wherein the storing of the one or more environment values of the function before execution of the function further comprises inserting break instructions at the location of the first instruction of the function and a location of a third instruction of the function in response to the break instruction inserted at the location of the second instruction of the function being executed after the first instruction of the function has been restored and executed.

7. The method of claim 6, wherein the storing of the one or more environment values of the function before execution of the function further comprises:

inserting a break instruction at the location of the second instruction of the function again; and restoring and executing the third instruction of the function in response to the break instruction inserted at the location of the third instruction of the function being executed, and after the second instruction of the function has been restored and executed.

8. The method of claim 5, wherein the return address of the function is set to the location of the second instruction of the function.

9. The method of claim 1, wherein the storing of the one or more environment values of the function after execution of the function comprises:

moving an execution location to a location of a second instruction of the function set as the return address of the function once the last instruction of the function is executed; and identifying the one or more environment values of the function after execution of the function by executing a break instruction inserted at the location of the second instruction of the function.

10. An apparatus for dynamically instrumenting a program, the apparatus comprising:

a microprocessor;

an instruction managing unit configured to:

store instructions of a function of a program, and insert a break instruction at a location of each instruction of the function at a start of execution of the instruction of the function; and a probe handler configured to store one or more environment values of the function according to execution of each break instruction in response to execution of the instruction of the function proceeding to a return address of the function after a last instruction of the function is executed, wherein the program is executed in an application area and the probe handler stores the one or more environment values of the function in an operating system (OS) area such that the program is traced without affecting execution of the program.

11. The apparatus of claim 10, wherein the instruction managing unit is further configured to:

insert and execute the break instruction at a location of a first instruction of the function at a start of execution of the first instruction of the function; and manage the instructions of the function such that an execution location proceeds to a return address of the function and a break instruction inserted at the return address of the function is executed in response to a last instruction of the function being executed.

12. The apparatus of claim 10, wherein the probe handler is further configured to:

identify the one or more environment values of the function before execution of the function by executing the break instruction inserted at the location of the first instruction of the function; and identify the one or more environment values of the function after execution of the function by executing the break instruction inserted at the return address of the function.

13. A method of an apparatus for dynamically tracing a software program, the method comprising:

determining that a first instruction of a function of a software program to be executed is not stored in memory;

substituting a break instruction in place of the first instruction of the function;

loading to a memory a corresponding page comprising the first instruction of the function;

executing the break instruction to generate an exception;

executing the exception; and in response to executing the exception, measuring and storing one or more environment values of the function of the software program, wherein the software program is executed in an application area and a probe handler stores the one or more environment values of the function in an operating system (OS) area such that the software program is traced without affecting execution of the software program.

14. The method of claim 13, further comprising, for each subsequent instruction of the function of the software program:

substituting a subsequent break instruction in place of the subsequent instruction of the function;
restoring a previous instruction of the function;
executing the previous instruction of the function;
changing an execution location of the software program to the subsequent instruction of the function;
inserting a previous break instruction in place of the previous instruction of the function;
executing the subsequent break instruction to generate a subsequent exception;
executing the subsequent exception; and
in response to executing the subsequent exception, measuring and storing the one or more environment values of the function of the software program.

15. The method of claim 14, wherein, in response to the subsequent instruction of the function being a last instruction of the function of the software program:
the one or more environment values of the function of the software program are measured and stored;
the last instruction of the function is restored and executed; and
the execution location of the software program is changed back to the previous instruction of the function.

16. The method of claim 13, wherein:
the one or more environment values of the function comprise values for detecting an error of the software program; and
the one or more environment values of the function comprise at least one of: a register value, a location of a stack, and a location of the first instruction of the function.

17. The method of claim 13, wherein:
the break instruction is executed in the application area; and
the one or more environment values of the function are measured by the probe handler which operates in the operating system (OS) area.

* * * * *